(12) United States Patent
Inoue et al.

(10) Patent No.: US 6,747,652 B2
(45) Date of Patent: Jun. 8, 2004

(54) IMAGE PROCESSING DEVICE AND METHOD FOR GENERATING THREE-DIMENSIONAL CHARACTER IMAGE AND RECORDING MEDIUM FOR STORING IMAGE PROCESSING PROGRAM

(75) Inventors: Satoru Inoue, Saitama (JP); Hajime Takezawa, Nara (JP); Minehiro Konya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 10/146,825

(22) Filed: May 17, 2002

(65) Prior Publication Data

US 2002/0171648 A1 Nov. 21, 2002

(30) Foreign Application Priority Data

May 17, 2001 (JP) ........................................ 2001-148111

(51) Int. Cl.⁷ .............................................. G06T 13/00
(52) U.S. Cl. ........................................ 345/474; 382/154
(58) Field of Search ................................ 345/474, 473, 345/475, 419; 382/154, 199, 153, 159; 348/42, 39, 45, 51, 46

(56) References Cited

U.S. PATENT DOCUMENTS

| 5,144,685 | A | * | 9/1992 | Nasar et al. ................. 382/153 |
| 5,577,981 | A | * | 11/1996 | Jarvik ............................ 482/4 |
| 6,271,875 | B1 | * | 8/2001 | Shimizu et al. ................ 348/42 |
| 6,556,775 | B1 | * | 4/2003 | Shimada ...................... 386/121 |
| 2002/0025073 | A1 | * | 2/2002 | Shibuya ....................... 382/199 |
| 2003/0007680 | A1 | * | 1/2003 | Iijima et al. ................. 382/154 |

FOREIGN PATENT DOCUMENTS

| JP | 04-289976 | 10/1992 | ........... G06F/15/60 |
| JP | 2000-293710 | 10/2000 | ........... G06T/17/40 |
| JP | 2001-109907 | 4/2001 | ........... G06T/17/00 |
| JP | 2001-109913 | 4/2001 | ........... G06T/17/40 |

* cited by examiner

*Primary Examiner*—Mark Zimmerman
*Assistant Examiner*—Huedung X. Cao
(74) *Attorney, Agent, or Firm*—David G. Conlin; John J. Penny, Jr.; Edwards & Angell, LLP (57) ABSTRACT

An image processing device for generating a 3-D character image of the present invention includes: an image input section for inputting a face image; a storage section for prestoring of 3-D models, body images, and information on a direction, position, and size of a face conforming to the body images; a user input section having a position designation means and a body selection means; an image processing section, including a textured image generation means for generating a textured image so as to paste the input image onto the 3-D model, a textured image storage means, a face image generation means, and a combining means for combining a body image and an image generated by the face image generation section so as to generate a 3-D character image; and a display section.

19 Claims, 9 Drawing Sheets

IMAGE PROCESSING DEVICE AND METHOD FOR GENERATING THREE-DIMENSIONAL CHARACTER IMAGE AND RECORDING MEDIUM FOR STORING IMAGE PROCESSING PROGRAM

BACKGROUND OF THE INVENTION

1. Field of the Invention

The present invention relates to a three-dimensional character image processing device and method for generating a realistic three-dimensional model by using an image, and to a recording medium for storing an image processing program.

2. Description of the Related Art

Conventionally, various techniques for generating a realistic three-dimensional (hereinafter referred to as "3-D") character image using a plurality of images have been proposed.

For example, in a 3-D model generation device disclosed in Japanese Laid-Open Patent Publication No. 2001-109907, a 3-D model is transformed so as to conform to an input image by designating positions of specific points in a face image included in the input image. A corresponding relationship between the input image and the 3-D model is calculated so as to generate a textured image such that the generated textured image includes a face image as viewed from the front and pixel values in the textured image are uniform both inside and outside of the outline of the face, thereby generating a natural 3-D character image.

Further, a 3-D model generation device disclosed in Japanese Patent Application No. 11-283387 (Japanese Laid-Open Patent Publication No. 2001-109913) is provided with a means for selecting models corresponding to various parts of a 3-D character image to be generated, so that a posture and a hairstyle of the character in the 3-D character image can be freely selected according to a user's preference.

In the above-described conventional techniques, 3-D models corresponding to various parts, such as a face, hair, a body, etc., are provided so as to generate a realistic 3-D character image using a plurality of images. When generating a face image, calculations for converting the 3-D models into images are simultaneously performed so that positions of the various parts are not inconsistent in a depth direction.

This method requires a great number of calculations in the steps of rotating the models, pasting a textured image on each surface of the models, and realizing consistency of the model surfaces in the depth direction. Therefore, a storage device having a great capacity is required for the calculations. Therefore, in order to generate a realistic 3-D character image using this method, it is necessary to use a computing unit exclusively structured for image processing or a device which includes an image processing program specialized for use in a specific device and incorporated into a personal computer having a general-purpose computing function with high processing ability.

That is, the conventional method cannot be performed by a computing device or a mobile computer, which do not have a storage device with a great capacity, and therefore such a computing device or mobile computer cannot generate a realistic 3-D character image. Further, in the computing device or mobile computer with a relatively low processing ability, which do not have a computing unit for exclusive use in image processing, even if a problem related to the capacity of the storage device is solved, a great deal of time is spent for calculations, making a user of the device feel uncomfortable.

SUMMARY OF THE INVENTION

An image processing device for generating a 3-D character image of a target object included in an input image of the present invention includes: an image input section for inputting a face image; a storage section for prestoring plurality types of 3-D models of hair and faces, a plurality of body images, and information on a direction, position, and size of a face conforming to the body images; a user input section having a position designation means for designating an arbitrary position in the image input via the image input section and a body selection means for selecting the body image stored in the storage section; an image processing section, including a textured image generation means for generating, based on information representing a position designated by the position designation section, a textured image as viewed from a prescribed position and direction having a prescribed size so as to paste the input image onto the 3-D model, a textured image storage means for storing the textured image generated by the textured image generation section, a face image generation means for generating a 3-D still head image by rotating a 3-D face model according to the information on a direction, position and size of a face conforming to the body image, painting the hair, and pasting the textured image onto the 3-D face model, and a combining means for combining a body image selected by the body selection means and an image generated by the face image generation section so as to generate a 3-D character image; and a display section for displaying the 3-D character image generated by the image processing section.

An image processing method for generating a 3-D character image of a target object included in an input image of the present invention includes the steps of: a) inputting a face image via an image input section; b) storing in a storage section plurality types of 3-D models of hair and faces, a plurality of body images, and information on a direction, position, and size of a face conforming to the body images; c) designating an arbitrary position in the image input via the image input section; d) selecting the body image stored in the storage section; e) generating, based on information representing a position designated by step c), a textured image as viewed from a prescribed position and direction having a prescribed size so as to paste the input image onto the 3-D face model; f) storing the textured image generated by step d); g) generating a 3-D still head image by rotating 3-D face and hair models according to the information on a direction, position and size of a face conforming to the body image selected by step d), painting the hair, and pasting the textured image onto the 3-D face model; h) combining a body image selected by step d) and an image generated by step g) so as to generate a 3-D character image; and i) displaying the 3-D character image generated by step h).

A computer-readable recording medium of the present invention stores an image processing program for executing an image processing method for generating a 3-D character image of a target object included in an input image, and the method includes the steps of: a) inputting a face image via an image input section; b) storing in a storage section plurality types of 3-D models of hair and faces, a plurality of body images, and information on a direction, position, and size of a face conforming to the body images; c) designating an arbitrary position in the image input via the image input section; d) selecting the body image stored in the storage section; e) generating, based on information representing a position designated by step c), a textured image as viewed from a prescribed position and direction having a prescribed size so as to paste the input image onto the 3-D face model; f) storing the textured image generated by step d); g) generating a 3-D still head image by rotating a 3-D face model according to the information on a direction, position and size of a face conforming to the body image selected by step d), painting the hair, and pasting the textured image onto the 3-D face model; h) combining a body image selected by step d) and an image generated by step g) so as to generate a 3-D character image; and i) displaying the 3-D character image generated by step h).

With the above-described image processing device, method and recording medium of the present invention, a 3-D character image is generated by combining a face image, having an arbitrary direction, position and size, with a body image selected by the body selection means. The face image is generated by designating specific points in a face image input via the image input section using the position designation means and pasting a hair image and the input face image onto 3-D hair and face models. According to the present invention, initially the face image is input via the image input section and the specific points in the input face image are designated using the position designation means, and then a face image, which has a direction, position and size designated by calculations based on the input face image, is generated. The generated face image and a pre-stored body image are combined so as to generate a desired 3-D character image. In this manner, although the present invention uses calculations for generation of the face image, calculations related to each of hair and body images are reduced so as to be minimal, and therefore it is possible to generate a highly-realistic 3-D character image even using a computing device or mobile computer with relatively low processing ability.

Further, in the case where a plurality of time-series body images and information on a direction, position and size of a face conforming to the body images are provided, it is possible to generate a highly-realistic 3-D animated character image using time-series information on the motion of body and face images.

In one embodiment of the present invention, the storage section stores a plurality of hair and face models, and the user input section includes a model selection section for selecting the plurality of hair and face models stored in the storage section.

In one embodiment of the present invention, step b) further includes the steps of j) storing a plurality of hair and face models and k) selecting the plurality of hair and face models stored by step b).

Further, with the above-described image processing device, method and recording medium of the present invention, the storage section stores a plurality of hair and face models and the user input section includes the model selection means, and therefore a model can be selected so as to match the hairstyle and the shape of the face (e.g. a round, square or sharp face) of a person who is a subject of an input image, thereby generating a highly-realistic still or animated image which looks the same as that person.

In one embodiment of the present invention, the storage section prestores a plurality of body images, which vary with the lapse of time, and information on a direction, position and size of a face conforming to the body images; and the combining means generates a 3-D animated image by generating a plurality of still images based on the 3-D head image generated by the face image generation means, the plurality of body images, which vary with the lapse of time, and the information on a direction, position and size of a face conforming to the body images.

In one embodiment of the present invention, the storage section stores vector still image data and information on a direction, position and size of a face for generating a still body image and the combining means generates the still body image based on the vector still image data stored in the storage section and combines the 3-D still head image generated by the face image generation section and the still body image based on the information on a direction, position and size of a face for generating the still body image.

In one embodiment of the present invention, the storage section stores vector or vector graphics animated body image data and information on a direction, position and size of a face for generating an animated body image, the face image generation section generates a plurality of face images, and the combining means generates the animated body image based on the vector animated image data stored in the storage section and combines the plurality of face images generated by the face image generation section and the animated body image based on time-series information on a direction, position and size of a face stored in the storage section.

In one embodiment of the present invention, step b) includes prestoring a plurality of body images, which vary with the lapse of time, and information on a direction, position and size of a face conforming to the body images; and step h) includes generating a 3-D animated image by generating a plurality of still images based on the 3-D still head image generated by step g), the plurality of body images, which vary with the lapse of time, and the information on a direction, position and size of a face conforming to the body images.

In one embodiment of the present invention, step b) includes storing vector still image data and information on a direction, position and size of a face for generating a still body image; and step h) includes generating the still body image based on the vector still image data stored by step b) and combining the 3-D still head image generated by step g) and the still body image based on the information on a direction, position and size of a face for generating the still body image.

In one embodiment of the present invention, step b) includes storing vector or vector graphics animated body image data and information on a direction, position and size of a face for generating an animated body image; step g) includes generating a plurality of face images; and step h) includes generating the animated body image based on the vector animated image data stored by step b) and combining the plurality of face images generated by step g) and the animated body image based on time-series information on a direction, position and size of a face stored by step b).

Further, in the image processing device, method and recording medium of the present invention, by storing vector still image data or vector or vector graphics animated data in the storage section, an animated or still body image can be generated from the vector still image data or vector graphics animated data, and therefore the data amount can be significantly reduced. Even when the size of the still or animated image is changed, few quantization errors are caused by enlargement or reduction of the still or animated image, and therefore a high quality still or animated image can be generated.

In one embodiment of the present invention, the image processing device further includes a function of previewing a head image generated by the face image generation means and displayed on the display section for confirmation.

In One embodiment of the present invention, the image processing method further includes a function of previewing a head image generated by step g) and displayed on a display section for confirmation.

Further, in the image processing device, method and recording medium of the present invention, by providing a function of previewing a head image generated by the face image generation means and displayed on the display section for confirmation, even in the case where it takes time to generate a plurality of images, a process result can be confirmed by a user after the process is performed on a single image such that the plurality of images requested by the user are processed after the user's satisfaction at the process result. Therefore, there is no case where the user is unsatisfied with the process results after having waited a long time required for the processing of the plurality of images and recalculations for generation of those images are required. This allows a reduction in the overall time required for generating an animated image.

In one embodiment of the present invention, even when a hair or face model is changed by the model selection means, by prestoring a textured image in the textured image storage section, the face image generation section can reproduce a head image based on the textured image stored in the textured storage section by rotating the changed hair or face model according to information on a direction, position and size of a face conforming to a body image.

In one embodiment of the present invention, even when a hair or face model is changed by step k), by prestoring a textured image in step f), step g) can reproduce a head image based on the textured image stored in step f) by rotating the changed hair or face model according to information on a direction, position and size of a face conforming to a body image.

Further, in the image processing device, method and recording medium of the present invention, by prestoring a textured image in the textured image storage section, even when a hair or face model is changed by the model selection means, it is not necessary to designate specific positions in the input image again, and therefore the amount of operations performed by the user can be reduced and calculations for generation of the textured image can be omitted, thereby reducing the overall time required for generating the images.

In one embodiment of the present invention, even when a body image is changed by the body selection means, by prestoring a textured image in the textured image storage section, the face image generation section can reproduce a head image based on the textured image stored in the textured storage section by rotating head and face models according to information on a direction, position and size of a face conforming to the changed body image.

In one embodiment of the present invention, even when a body image is changed by step d), by prestoring a textured image in step f), step g) can reproduce a head image based on the textured image stored in step f) by rotating head and face models according to information on a direction, position and size of a face conforming to the changed body image.

Further, in the image processing device and method and recording medium of the present invention, by prestoring the textured image in the textured image storage section, even when a body image is changed by the body selection means, it is not necessary to designate specific positions in the input image again, and therefore the amount of operations performed by the user can be reduced and calculations for generation of the textured image can be omitted, reducing overall time required for generating the images.

In one embodiment of the present invention, the face image generation section has an antialiasing image reduction function for generating a high quality head image by generating an image larger than a target image and reducing a size of the generated image.

In one embodiment of the present invention, step g) further includes an antialiasing image reduction function step for generating a high quality head image by generating an image larger than a target image and reducing a size of the generated image.

Further, in the image processing device and method and recording medium of the present invention, by providing to the face image generation section the antialiasing image reduction function for generating a high quality head image by generating an image larger than a target image and reducing a size of the generated image, it is possible to generate a high quality head image, and where the generated head image is compressed so as to save the head image as, for example, a JPEG image using DCT (Discrete Cosine Transform), a high frequency component in head image data can be suppressed, thereby reducing noise in the compressed data and the size of the compressed data.

Thus, the invention described herein makes possible the advantages of providing: an image processing device and method in which a realistic and complicated 3-D character image can be generated through easy operations using a computing device or mobile computer with a relatively low processing ability, which does not have a computing unit for exclusive use in image processing nor a specialized image processing program; and a recording medium for storing an image processing program.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to the drawings.

Figure 1:
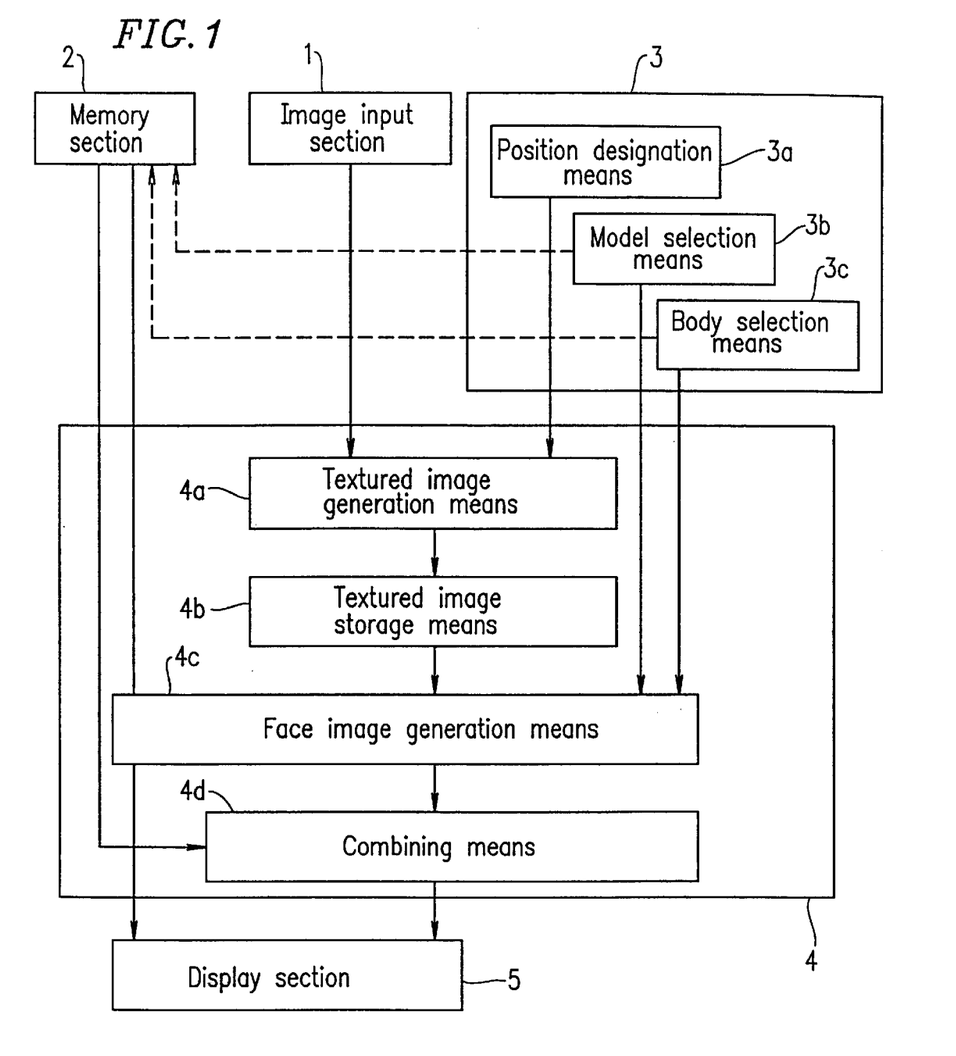
FIG. 1 is a diagram showing a schematic system structure of an image processing device for generating a 3-D character image according to an embodiment of the present invention.

FIG. 1 is a diagram showing a schematic system structure of an image processing device for generating a 3-D character image according to an embodiment of the present invention.

The image processing device according to this embodiment includes: an image input section 1; a storage section 2; a user input section 3; an image processing section 4; and a display section 5.

The image input section 1 receives a face image. For example, the face image is read from a file stored in a semiconductor, optical or magnetic storage device. Alternatively, the image input section 1 receives a video signal containing the face image from a digital still camera or a digital movie camera externally connected to or included in the image processing device.

The storage section 2 is a semiconductor, optical or magnetic storage device. The storage section 2 prestores a plurality of body images which vary with the lapse of time or vector data used for generating the plurality of body images. The storage section 2 also prestores information on a direction, a position, and a size of a face conforming to the body images, and multiple types of 3-D models of hair and faces.

The user input section 3 includes a position designation means 3a, a model selection means 3b, and a body selection means 3c.

The position designation means 3a includes a mouse, a keyboard or the like and designates an arbitrary position in the image input via the image input section 1. Specifically, the position designation means 3a is used so as to position a cursor at any desired position to be designated on the input image displayed on the display section 5 and to designate the position by a click or press of a key. This operation can be repeated until the desired position is designated. In this operation, when the input image is excessively magnified such that the entire input image is too large to be displayed on the display section 5, the magnified image can be suitably scrolled through or reduced in size.

The model selection means 3b displays on the display section 5 a list of thumbnail images or names of models stored in the storage section 2 such that a user can designate a thumbnail image or name of a desired body model and select the body model using a mouse or keyboard. Alternatively, when the user does not select any particular model, a prescribed default model is used for generating a 3-D character image.

The body selection means 3c displays on the display section 5 a list of thumbnail images or names of body models stored in the storage section 2 such that the user can designate a thumbnail image or name of a desired body model and select the body model using a mouse or keyboard.

The image processing section 4 includes a textured image generation means 4a, a textured image storage means 4b, a face image generation means 4c, and a combining means 4d.

The image processing section 4 controls the textured image generation means 4a so as to generate a textured image based on a face image input via the image input section 1 and information on the position designated using the position designation means 3a. The textured image storage means 4b temporarily stores the generated textured image. The face image generation means 4c generates an image of a head area according to information on a direction, a position and a size of the face image corresponding to the body model selected using the body selection means 3c. The combining means 4d combines this head image with the body image.

The display section 5 is a display device, such as a CRT or liquid crystal display, which can display the generated 3-D character image and an image or word depending on the necessity in the steps-described below.

Figure 2:
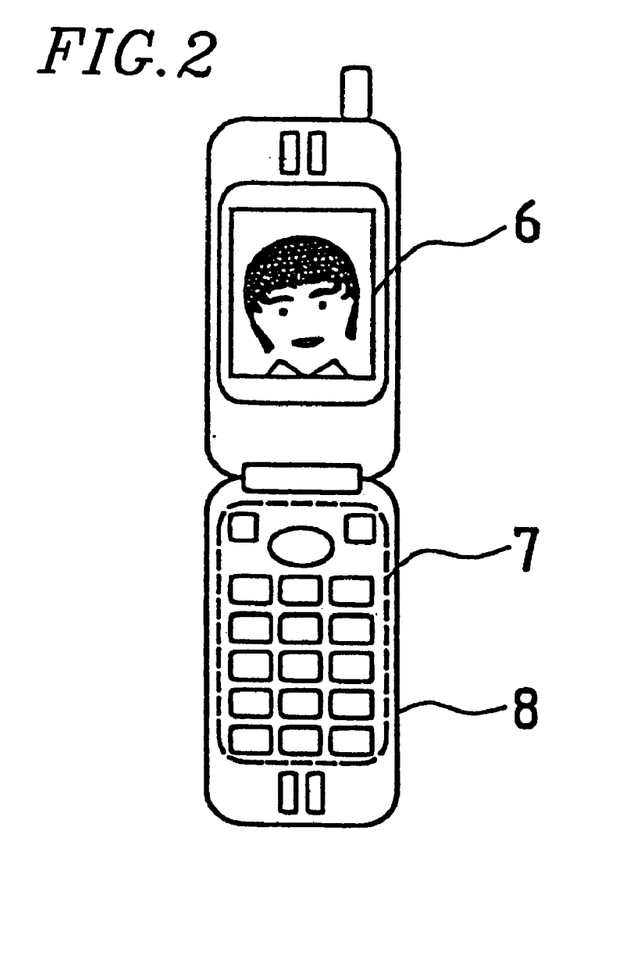
FIG. 2 shows a schematic view of an electronic apparatus including the image processing device for generating a 3-D character image according to an embodiment of the present invention.

FIG. 2 shows a schematic view of an electronic apparatus including the image processing device for generating a 3-D character image according to an embodiment of the present invention.

The image processing device, method and recording medium according to an embodiment of the present invention are characterized in that they can be used in an apparatus having a relatively low processing ability, such as a mobile phone shown in FIG. 2. The mobile phone includes a liquid crystal screen 6 and number/function keys 7 respectively corresponding to the display section 5 and the user input section 3 of the present invention. The mobile phone also includes a telephone body 8 incorporating the memory section 2 and image processing section 4 of the present invention.

Figure 3:
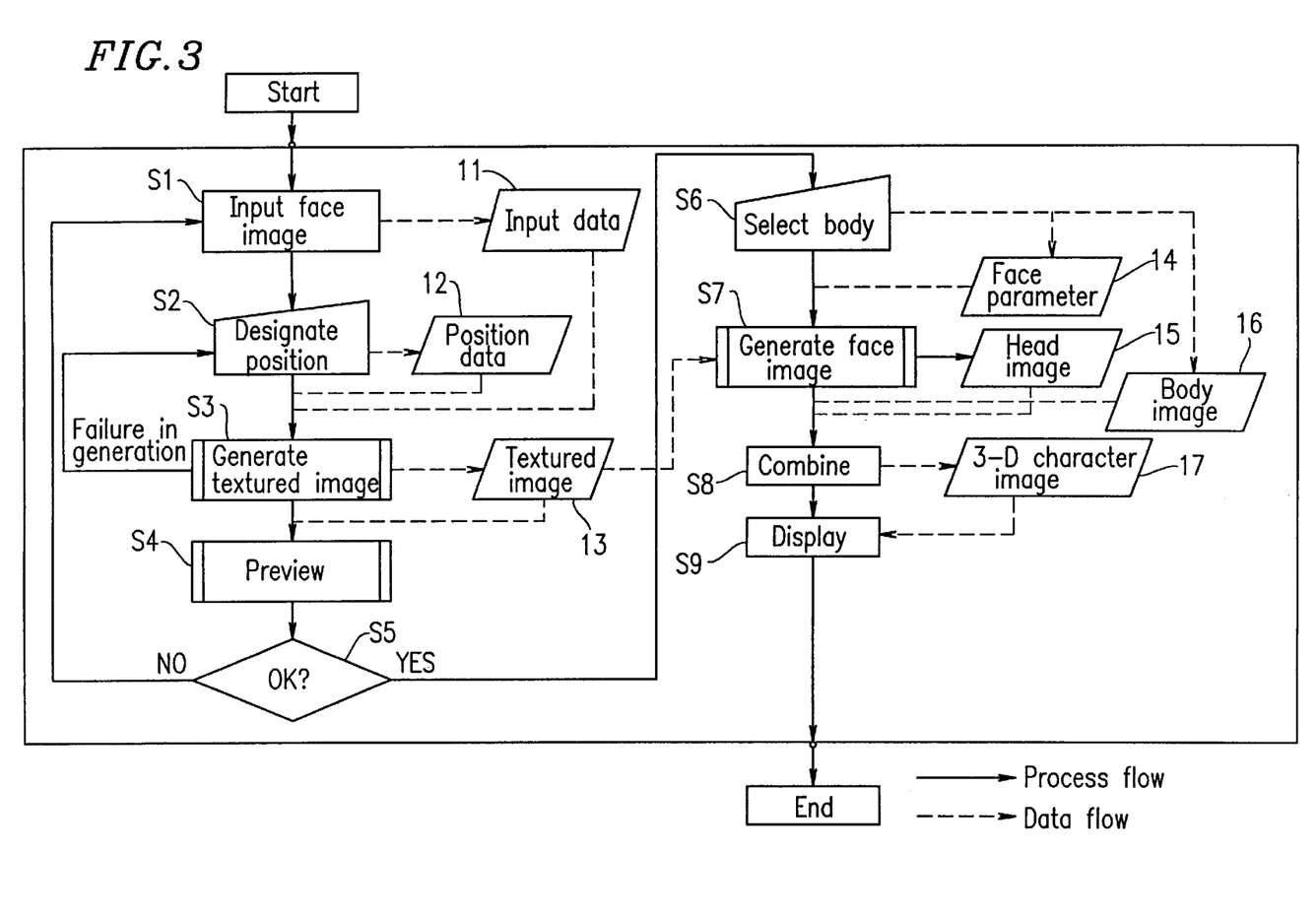
FIG. 3 is a flowchart showing an overall flow of the processing operation.
Figure 4:
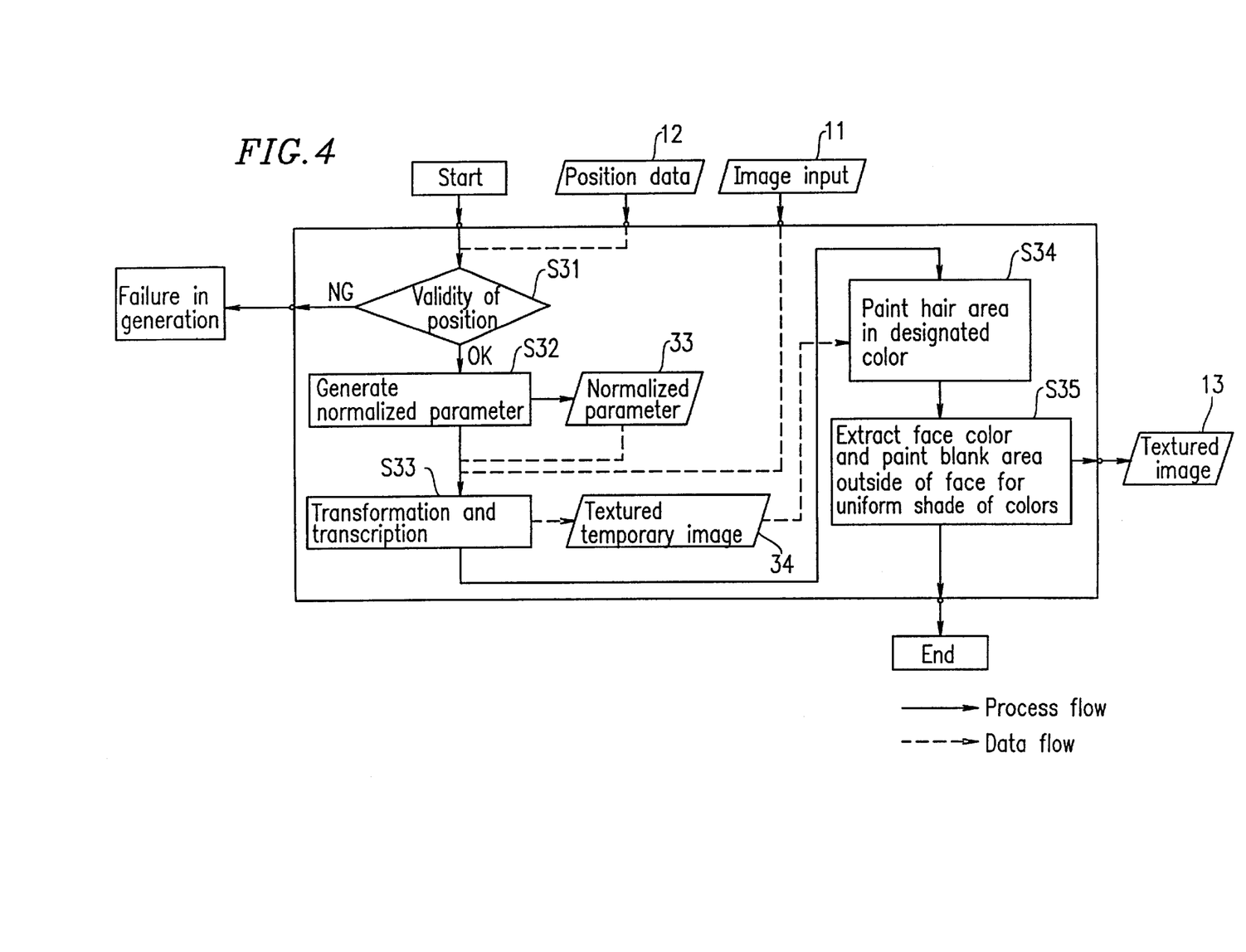
FIG. 4 is a flowchart showing details of a textured image generation process.
Figure 5:
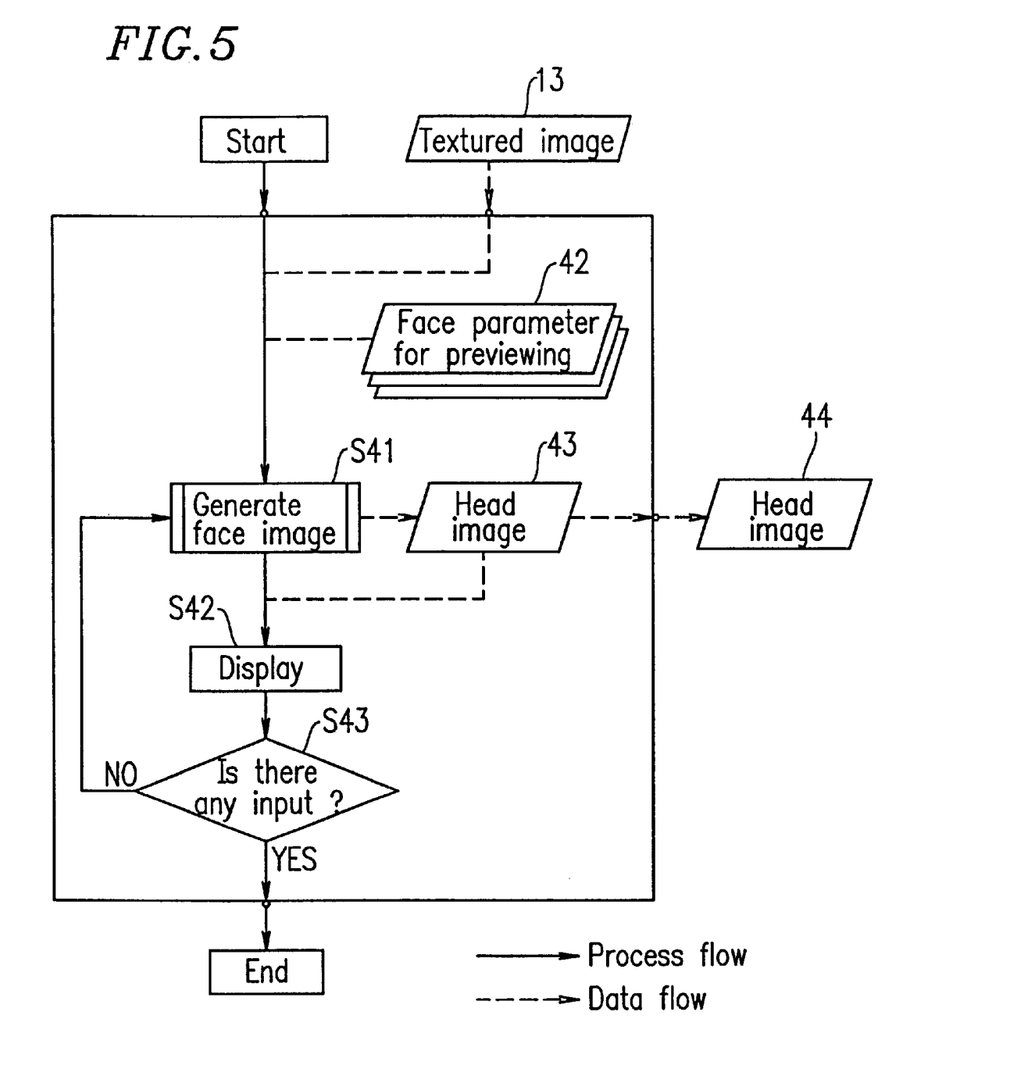
FIG. 5 is a flowchart showing details of a preview process.
Figure 6:
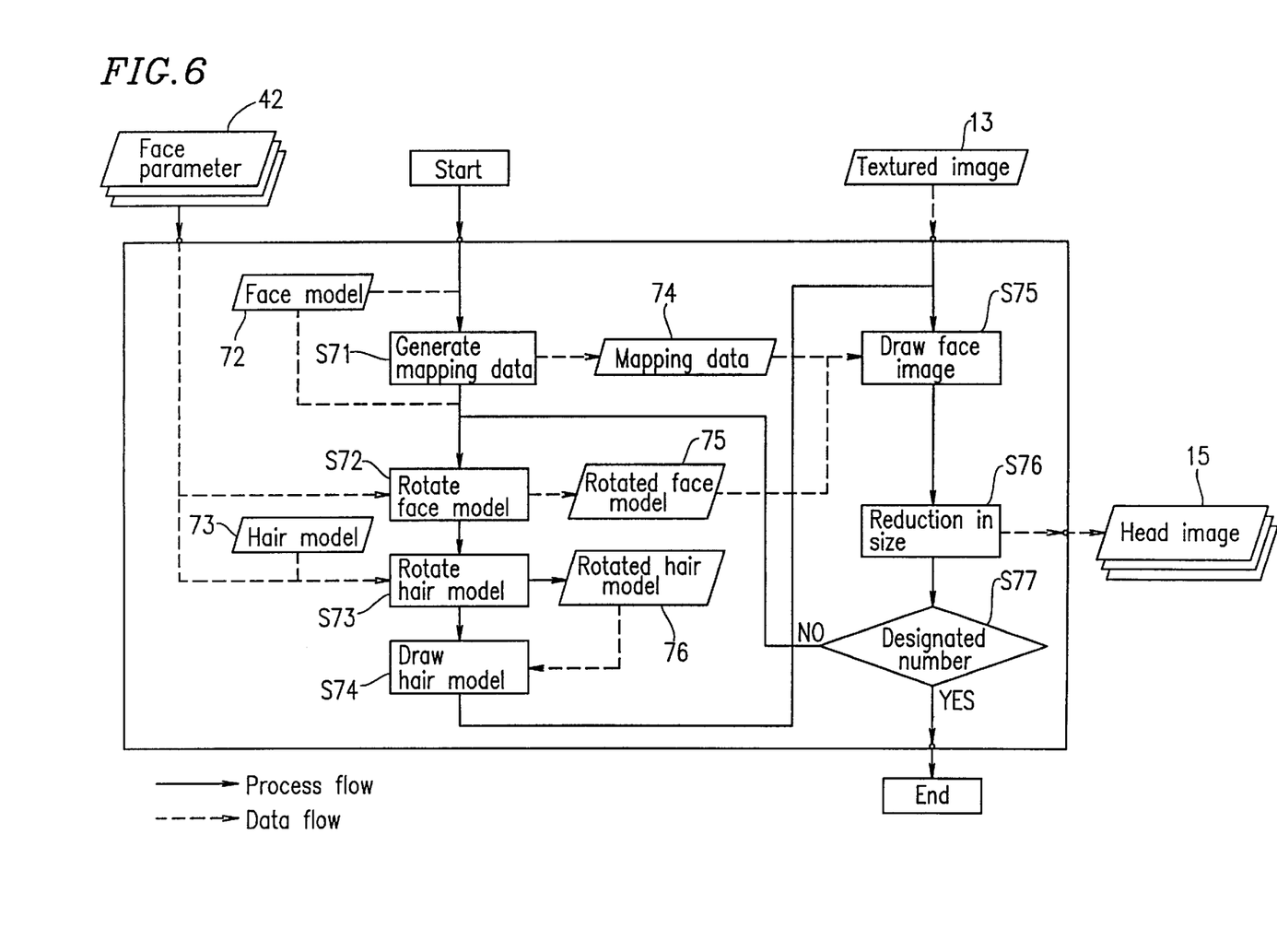
FIG. 6 is a flowchart showing details of an image generation process.

Next, a processing operation of the image processing device for generating a 3-D character image according to the present invention will be described in detail with reference to flow charts shown in FIGS. 3 through 6 and views shown in FIGS. 7 through 11. FIG. 3 shows an overall flow of the processing operation. FIG. 4 shows details of a textured image generation process. FIG. 5 shows details of a preview process. FIG. 6 shows details of an image generation process.

Referring to FIG. 3, at step S1 for inputting a face image, an input image 11 is input via the image input section 1 (FIG. 1).

Figure 7:
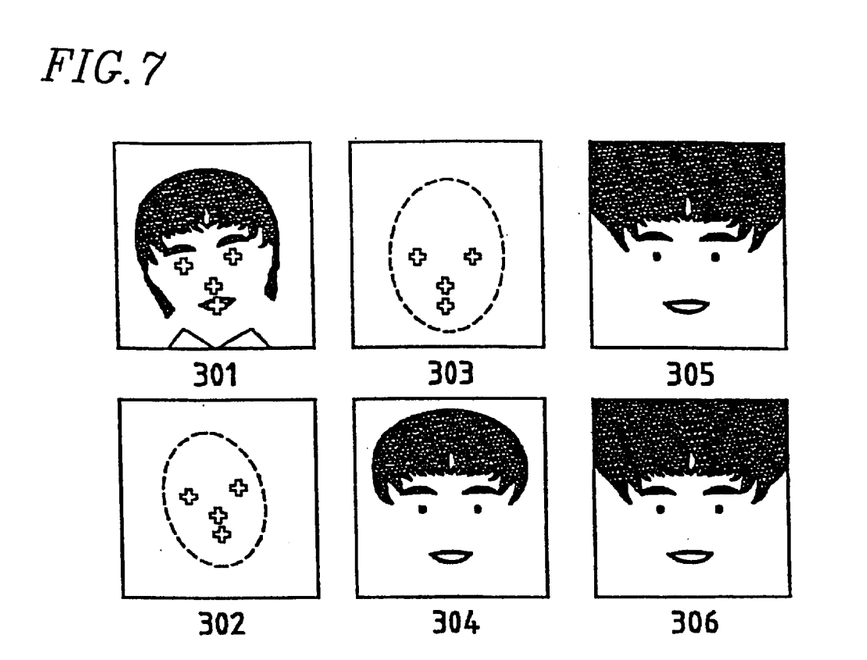
FIG. 7 is a view used for explaining a process for generating a textured image.

At step S2 for position designation, the input image 11 is displayed on the display section 5 and, as shown in FIG. 7, positions of four points (right and left eyes, a nose, and a mouth) in the input image 11 are designated by the position designation means 3a (FIG. 1) so as to obtain position data 12.

At step S3 for generating a textured image, a textured image 13 is obtained based on the input image 11 provided via the image input section 1 and the position data 12 representing the positions designated by the position designation section 3a.

Here, step S3 for generating a textured image is described in detail with reference to the flowchart of FIG. 4.

At step S31, the validity of the position data 12 is checked (for example, if a nose is positioned outside with respect to an eye in the face). When the position data 12 is determined to be invalid, generation of the textured image is cancelled and the process returns to step S2 for position designation.

At step S32, a parameter 33 is obtained from the position data 12 so as to transform an input image 302 shown in FIG. 7 into an image 303 as viewed from the front in which the positions of four points (right and left eyes, a nose, and a mouth) are corrected. At step S33, a part corresponding to the face in the input image 11 is transformed based on the parameter 33 so as to obtain an image 34 (corresponding to an image 304 shown in FIG. 7).

At step S34, an image 305 shown in FIG. 7 is obtained by painting an area above the hair in the image 34 with a prescribed hair color.

At step S35, in order to paint the remaining blank area, the color of an area inside the outline of the face is extracted and an area outside of the outline of the face is painted such that the shade of the colors is uniform inside and outside of the face, thereby obtaining a textured image 13 (corresponding to an image 306 shown in FIG. 7). The textured image 13 is temporarily stored in the textured image storage means 4b (FIG. 1). It should be noted that in FIG. 7, although the difference between the images 305 and 306 cannot be distinguished since they are represented as black and white images, the difference between the images 305 and 306 is clearly distinguishable in actual color images.

The present invention is characterized in that once the textured image 13 is stored in the textured image storage means 4b, step S3 for textured image generation can be omitted from future operations, even if the model is changed by the model selection means 3b or the body is changed by the body selection means 3c.

Further, the present invention provides a function of displaying a head image on the display section 5 prior to generation of a completed 3-D character image for confirmation. This function is performed at step S4 for previewing.

Next, step S4 for previewing is described in detail with reference to the flowchart of FIG. 5.

Face parameters 42 for previewing shown in FIG. 5 are time-series parameters corresponding to a plurality of face images, which are sequentially displayed so as to provide a preview of a face which moves from side to side and up and down.

Firstly, step S41 for generating a face image is performed according to a first one of the face parameters 42 for previewing so as to obtain the head image 43.

Step S41 is identical to step S7 for generating a face image shown in FIG. 3, and thus is described in detail in conjunction with step S7.

At step S42, the generated head image 43 is temporarily stored as a head image 44 in the storage section 2 (FIG. 1), while the head image 44 and letters, such as "Yes" or "No", which are selected by a user, are displayed on the display 5.

At step S43, it is determined whether or not there is any data input to the user input section 3. If there is no input data, the second parameter is selected from the parameters 42 for previewing, and the process is repeated again from step S41 for generating a face image. On the other hand, if there is some input data, the head image 44 is deleted from the face image generation means 4c, step S4 for previewing is ended, and the process proceeds to step S5.

Referring again to FIG. 3, at step S5, if "No" is selected, the textured image 13 is deleted from the textured image storage means 4b and the process returns to image input step S1.

On the other hand, if "Yes" is selected at step S5, the process proceeds to body selection step S6.

At body selection step S6, a list of thumbnail images or names of bodies stored in the storage section 2 is displayed on the display section 5 so as to prompt the user to select a thumbnail image or name from the list. A body image 16 of the body selected by the body selection means 3c and the face parameter 14 corresponding to the body image 16 are obtained.

At step S7 for generating a face image, a head image 15 is generated using a face parameter 14 and the textured image 13.

In the case where there are a plurality of time-series face parameters corresponding to body images, the present invention also provides a function of generating an animated image by generating a plurality of the head images 15 corresponding to the plurality of time-series face parameters 14 at step S7.

Next, step S7 for generating a face image is described in detail with reference to the flowchart of FIG. 6.

In FIG. 6, a face model 72 refers to a 3-D face model stored in the storage section 2.

Figure 8:
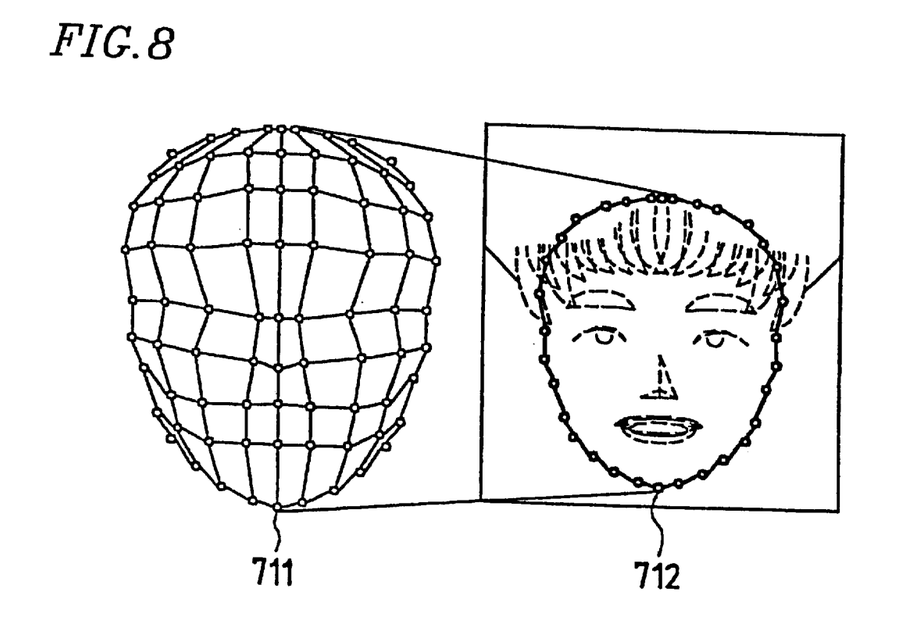
FIG. 8 is a schematic view showing generation of mapping data in a face image generation step.

At step S71, this 3-D face model (face model 72) is two-dimensionally projected so as to generate mapping data 74 representing a relationship between coordinates in a textured image (denoted by reference numeral 712 of FIG. 8) and coordinates in the 3-D face model (denoted by reference numeral 711 of FIG. 8). The mapping data 74 is not changed even if the face parameter 14 is changed.

At step S72, the face model 72 is transformed (rotated) according to the face parameter 14 so as to obtain a rotated model 75.

At step S73, similar to step S72, a hair model 73 stored in the storage section 2 is transformed (rotated) according to the face parameter 14 so as to obtain a rotated hair model 76.

Figure 9:
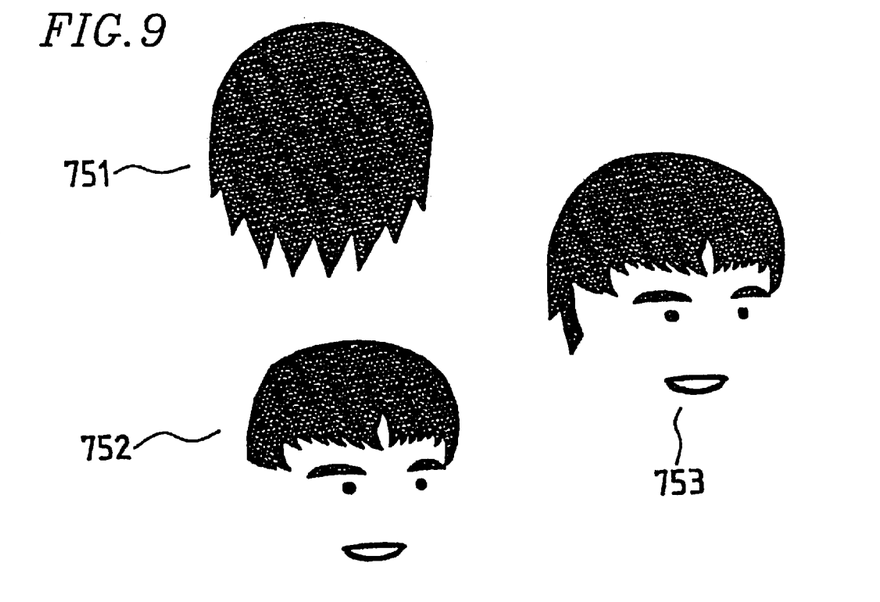
FIG. 9 is a view used for explaining a process for generating a head image.

At step S74, a hair image denoted by reference numeral 751 of FIG. 9 is drawn in a blank image according to the rotated model 76.

At step S75, a face image denoted by reference numeral 752 of FIG. 9 is generated using the mapping data 74, the face model 75, and the textured image 13, and fine adjustments are performed on the face image 752 so as to obtain a face image denoted by reference numeral 753 of FIG. 9.

Further, the present invention provides an antialiasing image reduction function. At step S74 for drawing hair image and step S75 for drawing a face image, an image having twice the size of a target image is generated. At step S76 for image reduction, the size of the generated image is reduced by half so as to obtain the target image.

Figure 10:
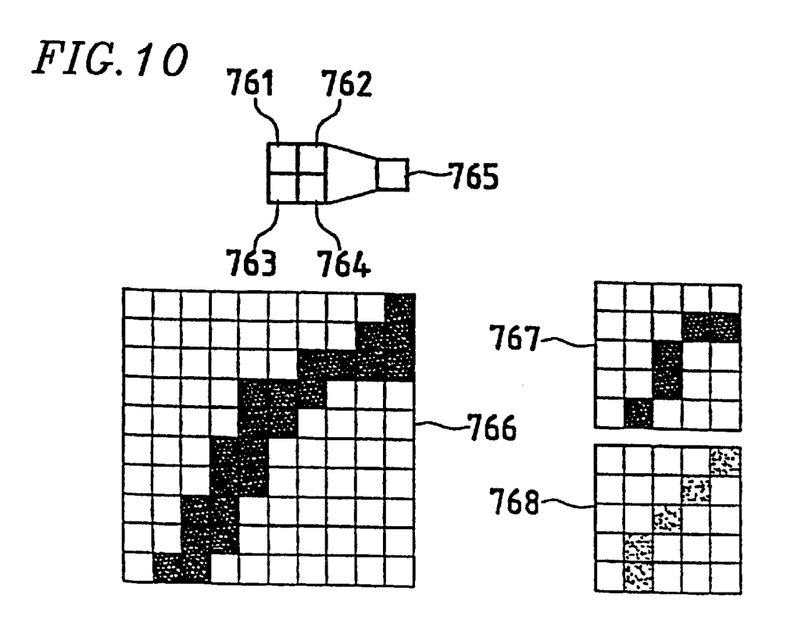
FIG. 10 is a view used for explaining a head image reduction method.

Specifically, at step S76 for image reduction, the size of the image is reduced such that an average pixel value for four points in the image (denoted by reference numerals 761, 762, 763 and 764 of FIG. 10) is equal to a pixel value for a single point in a reduced image (denoted by reference numeral 765 of FIG. 10).

By employing this step S76 for image reduction, it is possible to generate a high quality image since a quantization error caused by decimation calculation is reduced by generating a large image when the face image or the like is directly generated from the textured image, and the quality of the generated large image is maintained because of antialiasing effects. Further, even when the generated head image is compressed into, for example, a JPEG image using DCT (Discrete Cosine Transform), by suppressing a high frequency component in image data, reduction in noise and size of compressed data can be achieved.

In FIG. 10, reference numeral 767 denotes pixel arrays obtained by decimating and reducing pixel arrays denoted by reference numeral 766, and reference numeral 768 denotes pixel arrays obtained by reducing the pixel arrays 766 using an antialiasing method.

The image generated at steps S75 or S76 is stored as the head image 15 in the storage section 2.

At step S77, it is determined whether or not a plurality of head images 15 corresponding to the plurality of face parameters 14 are generated. If the number of the head images 15 does not match with that of the face parameters 14, the process is repeated from step S72. On the other hand, if a designated number of head images 15 have been generated, step S7 for generating a face image is ended, and the process proceeds to step S8 for combining.

Figure 11:
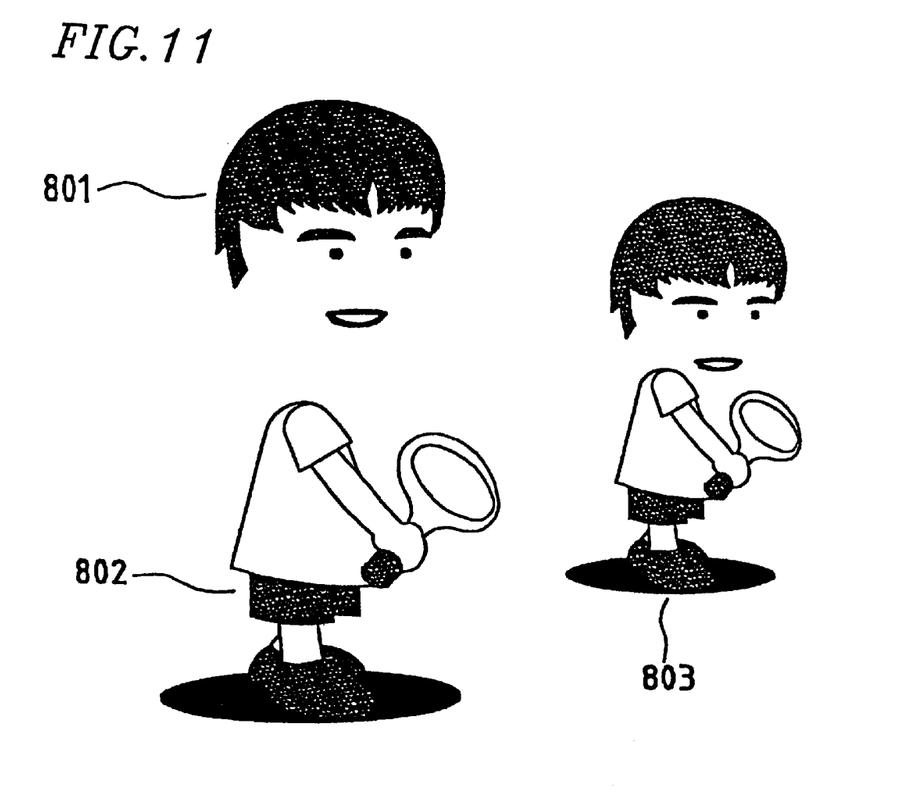
FIG. 11 is a view used for explaining a step of combining a head image and a body image.

Referring again to FIG. 3, at step S8 for combining, a body image 16 (denoted by reference numeral 802 in FIG. 11) and the head image 15 (denoted by reference numeral 801 in FIG. 11) are combined so as to obtain a completed 3-D character image 17 (denoted by reference numeral 803 in FIG. 11).

According to the present invention, it is possible to use vector data instead of using the body image. In such a case, a plurality of time-series head images are pregenerated, and the body image is generated from the vector data and is combined with the head image by combining means 4d so as to generate a still image or animated image.

At step S9 for displaying, the generated still image or animated image of the 3-D character image 17 is displayed on the display section 5.

The image processing device of the present invention is realized by a program for performing image processing for generating a 3-D character image.

The scope of the present invention includes both the program itself and a computer-readable recording medium for storing the program.

This recording medium for storing the program is not shown in the drawings. The recording medium for storing the program can be a memory device, such as a ROM, required for processing in the image processing section 4. Alternatively, a program reading device is provided as an external storage device (not shown) so as to read the program stored in the recording medium. In any case, the stored program can be executed by an access by a microcomputer. Alternatively, the program is read and loaded into a program storage area in the microcomputer so as to be executed. In this case, the program to be loaded is prestored in the image processing device.

The recording medium described herein is a removable medium which prestores a program. Examples of such a medium include: a tape medium such as a magnetic tape; a magnetic disk such as a floppy disk, hard disk or the like; an optical disk such as a CD-ROM, MO, MD, DVD or the like; a card such as an IC card (including a memory card), optical card or the like; and a semiconductor memory such as a mask ROM, EPROM, EEPROM, flash ROM or the like.

Further, in the case where the present invention provides a system which is structured so as to be connectable to a communication network including the internet, the recording medium can flexibly download a program via the communication network. In such a case of downloading the program via the communication network, a program for downloading is prestored in the imaging processing device or a program for downloading stored in another recording medium is installed in the imaging processing device. In this case, what is stored in another recording medium is not limited to the program, and data can be installed in the imaging processing device from the recording medium.

Furthermore, the program provided by the present invention can be a process executed by the image processing section 4 shown in FIG. 1 or a program which is obtained through an access to the communication network including the internet or transferred from the image processing device over the communication network. Alternatively, the program provided by the present invention can be a program processed or generated by the image processing device based on the program obtained through the communication network or can be a program processed or generated by the image processing device so as to be transferred over the communication network. It should be noted that data can be provided instead of the program described above.

With the above-described image processing device, method and recording medium of the present invention, a 3-D character image is generated by combining a face image, having an arbitrary direction, position and size, with and a body image selected by the body selection means. The face image is generated by designating specific points in a face image input via the image input section using the position designation means and pasting a hair image and the input face image onto 3-D hair and face models. According to the present invention, initially the face image is input via the image input section and the specific points in the input face image are designated using the position designation means, and then a face image, which has a direction, position and size designated by calculations based on the input face image, is generated. The generated face image and a prestored body image are combined so as to generate a desired 3-D character image. In this manner, although the present invention uses calculations for generation of the face image, calculations related to each of hair and body images are reduced so as to be minimal, and therefore it is possible to generate a highly-realistic 3-D character image even using a computing device or mobile computer with relatively low processing ability.

Further, in the case where a plurality of time-series body images and information on a direction, position and size of a face conforming to the body images are provided, it is possible to generate a highly-realistic 3-D animated character image using time-series information on the motion of body and face images.

Furthermore, with the above-described image processing device, method and recording medium of the present invention, the storage section stores a plurality of hair and face models and the user input section includes the model selection means, and therefore a model can be selected so as to match the hairstyle and the shape of the face (e.g., a round, square or sharp face) of a person who is a subject of an input image, thereby generating a highly-realistic still or animated image which looks the same as that person.

Further still, in the image processing device, method and recording medium of the present invention, by storing vector still image data or vector or vector graphics animated data in the storage section, an animated or still body image can be generated from the vector still image data or vector or vector graphics animated data, and therefore the data amount can be significantly reduced. Even when the size of the still or animated image is changed, few quantization errors are caused by enlargement or reduction of the still or animated image, and therefore a high quality still or animated image can be generated.

Further still, in the image processing device, method and recording medium of the present invention, by providing a function of previewing a head image generated by the face image generation means and displayed on the display section for confirmation, even in the case where it takes time to generate a plurality of images, a process result can be confirmed by a user after the process is performed on a single image such that the plurality of images requested by the user are processed after the user's satisfaction at the process result. Therefore, there is no case where the user is unsatisfied with the process results after having waited a long time required for the processing of the plurality of images and recalculations for generation of those images are required. This allows a reduction in the overall time required for generating an animated image.

Further still, in the image processing device, method and recording medium of the present invention, by prestoring a textured image in the textured image storage section, even when a hair or face model is changed by the model selection means, it is not necessary to designate specific positions in the input image again, and therefore the amount of operations performed by the user can be reduced and calculations for generation of the textured image can be omitted, thereby reducing the overall time required for generating the images.

Further still, in the image processing device, method and recording medium of the present invention, by prestoring the textured image in the textured image storage section, even when a body image is changed by the body selection means, it is not necessary to designate specific positions in the input image again, and therefore the amount of operations performed by the user can be reduced and calculations for generation of the textured image can be omitted, reducing overall time required for generating the images.

Further still, in the image processing device, method and recording medium of the present invention, by providing to the face image generation section the antialiasing image reduction function for generating a high quality head image by generating an image larger than a target image and reducing a size of the generated image, it is possible to generate a high quality head image, and where the generated head image is compressed so as to save the head image as, for example, a JPEG image using DCT (Discrete Cosine Transform), a high frequency component in image data can be suppressed, reducing noise in the compressed data and the size of the compressed data.

As described above, the present invention provides: an image processing device and method for generating a 3-D character image in which a realistic and complicated character image can be generated through easy operations using a computing device or mobile computer with a relatively low processing ability, which does not have a computing unit for exclusive use in image processing nor a specialized image processing program; and a recording medium for storing an image processing program.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing device for generating a 3-D character image of a target object included in an input image, comprising:
    an image input section for inputting a face image;
    a storage section for prestoring plurality types of 3-D models of hair and faces, a plurality of body images, and information on a direction, position, and size of a face conforming to the body images;
    a user input section having a position designation means for designating an arbitrary position in the image input via the image input section and a body selection means for selecting the body image stored in the storage section;
    an image processing section, comprising
        a textured image generation means for generating, based on information representing a position designated by the position designation section, a textured image as viewed from a prescribed position and direction having a prescribed size so as to paste the input image onto the 3-D model,
        a textured image storage means for storing the textured image generated by the textured image generation section,
        a face image generation means for generating a 3-D still head image by rotating a 3-D face model according to the information on a direction, position and size of a face conforming to the body image, painting the hair, and pasting the textured image onto the 3-D face model, and
        a combining means for combining a body image selected by the body selection means and an image generated by the face image generation section so as to generate a 3-D character image; and
    a display section for displaying the 3-D character image generated by the image processing section.

2. An image processing device according to claim 1, wherein the storage section stores a plurality of hair and face models, and the user input section includes a model selection section for selecting the plurality of hair and face models stored in the storage section.

3. An image processing device according to claim 1, wherein: the storage section prestores a plurality of body images, which vary with the lapse of time, and information on a direction, position and size of a face conforming to the body images; and
    the combining means generates a 3-D animated image by generating a plurality of still images based on the 3-D head image generated by the face image generation means, the plurality of body images, which vary with the lapse of time, and the information on a direction, position and size of a face conforming to the body images.

4. An image processing device according to claim 1, wherein: the storage section stores vector still image data and information on a direction, position and size of a face for generating a still body image; and
    the combining means generates the still body image based on the vector still image data stored in the storage section and combines the 3-D still head image generated by the face image generation section and the still body image based on the information on a direction, position and size of a face for generating the still body image.

5. An image processing device according to claim 1, wherein: the storage section stores vector or vector graphics animated body image data and information on a direction, position and size of a face for generating an animated body image;
    the face image generation section generates a plurality of face images; and
    the combining means generates the animated body image based on the vector animated image data stored in the storage section and combines the plurality of face images generated by the face image generation section and the animated body image based on time-series information on a direction, position and size of a face stored in the storage section.

6. An image processing device according to claim 1, further comprising a function of previewing a head image generated by the face image generation means and displayed on the display section for confirmation.

7. An image processing device according to claim 2, wherein even when a hair or face model is changed by the model selection means, by prestoring a textured image in the textured image storage section, the face image generation section can reproduce a head image based on the textured image stored in the textured storage section by rotating the changed hair or face model according to information on a direction, position and size of a face conforming to a body image.

8. An image processing device according to claim 1, wherein even when a body image is changed by the body selection means, by prestoring a textured image in the textured image storage section, the face image generation section can reproduce a head image based on the textured image stored in the textured storage section by rotating head and face models according to information on a direction, position and size of a face conforming to the changed body image.

9. An image processing device according to claim 1, wherein the face image generation section has an antialiasing image reduction function for generating a high quality head image by generating an image larger than a target image and reducing a size of the generated image.

10. An image processing method for generating a 3-D character image of a target object included in an input image, comprising the steps of:

a) inputting a face image via an image input section;
b) storing in a storage section plurality types of 3-D models of hair and faces, a plurality of body images, and information on a direction, position, and size of a face conforming to the body images;
c) designating an arbitrary position in the image input via the image input section;
d) selecting the body image stored in the storage section;
e) generating, based on information representing a position designated by step c), a textured image as viewed from a prescribed position and direction having a prescribed size so as to paste the input image onto the 3-D face model;
f) storing the textured image generated by step d);
g) generating a 3-D still head image by rotating 3-D face and hair models according to the information on a direction, position and size of a face conforming to the body image selected by step d), painting the hair, and pasting the textured image onto the 3-D face model;
h) combining a body image selected by step d) and an image generated by step g) so as to generate a 3-D character image; and
i) displaying the 3-D character image generated by step h).

11. An image processing method according to claim 10, wherein step b) further includes the steps of j) storing a plurality of hair and face models and k) selecting the plurality of hair and face models stored by step b).

12. An image processing method according to claim 10, wherein: step b) includes prestoring a plurality of body images, which vary with the lapse of time, and information on a direction, position and size of a face conforming to the body images; and step h) includes generating a 3-D animated image by generating a plurality of still images based on the 3-D still head image generated by step g), the plurality of body images, which vary with the lapse of time, and the information on a direction, position and size of a face conforming to the body images.

13. An image processing method according to claim 10, wherein: step b) includes storing vector still image data and information on a direction, position and size of a face for generating a still body image; and step h) includes generating the still body image based on the vector still image data stored by step b) and combining the 3-D still head image generated by step g) and the still body image based on the information on a direction, position and size of a face for generating the still body image.

14. An image processing method according to claim 10, wherein: step b) includes storing vector or vector graphics animated body image data and information on a direction, position and size of a face for generating an animated body image;

step g) includes generating a plurality of face images; and
step h) includes generating the animated body image based on the vector animated image data stored by step b) and combining the plurality of face images generated by step g) and the animated body image based on time-series information on a direction, position and size of a face stored by step b).

15. An image processing method according to claim 10, further comprising a function of previewing a head image generated by step g) and displayed on a display section for confirmation.

16. An image processing method according to claim 11, wherein even when a hair or face model is changed by step k), by prestoring a textured image in step f), step g) can reproduce a head image based on the textured image stored in step f) by rotating the changed hair or face model according to information on a direction, position and size of a face conforming to a body image.

17. An image processing method according to claim 10, wherein even when a body image is changed by step d), by prestoring a textured image in step f), step g) can reproduce a head image based on the textured image stored in step f) by rotating head and face models according to information on a direction, position and size of a face conforming to the changed body image.

18. An image processing method according to claim 10, wherein step g) further includes an antialiasing image reduction function step for generating a high quality head image by generating an image larger than a target image and reducing a size of the generated image.

19. A computer-readable recording medium which stores an image processing program for executing an image processing method for generating a 3-D character image of a target object included in an input image, the method comprising the steps of:

a) inputting a face image via an image input section;
b) storing in a storage section plurality types of 3-D models of hair and faces, a plurality of body images, and information on a direction, position, and size of a face conforming to the body images;
c) designating an arbitrary position in the image input via the image input section;
d) selecting the body image stored in the storage section;
e) generating, based on information representing a position designated by step c), a textured image as viewed from a prescribed position and direction having a prescribed size so as to paste the input image onto the 3-D face model;
f) storing the textured image generated by step d);
g) generating a 3-D still head image by rotating a 3-D face model according to the information on a direction, position and size of a face conforming to the body image selected by step d), painting the hair, and pasting the textured image onto the 3-D face model;
h) combining a body image selected by step d) and an image generated by step g) so as to generate a 3-D character image; and
i) displaying the 3-D character image generated by step h).

* * * * *